(12) United States Patent
Moessner et al.

(10) Patent No.: US 9,650,027 B2
(45) Date of Patent: May 16, 2017

(54) BRAKE ACTUATION RECOGNITION DEVICE AND METHOD FOR DETECTING AN ACTUATION OF A BRAKE ACTUATING ELEMENT OF A BRAKE SYSTEM

(71) Applicants: Simon Moessner, Weinsberg (DE); Thomas Bruex, Sachsenheim-Kleinsachsenheim (DE); Branimir Tokic, Marbach am Neckar (DE)

(72) Inventors: Simon Moessner, Weinsberg (DE); Thomas Bruex, Sachsenheim-Kleinsachsenheim (DE); Branimir Tokic, Marbach am Neckar (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/376,106

(22) PCT Filed: Dec. 10, 2012

(86) PCT No.: PCT/EP2012/074885
§ 371 (c)(1),
(2) Date: Jul. 31, 2014

(87) PCT Pub. No.: WO2013/113436
PCT Pub. Date: Aug. 8, 2013

(65) Prior Publication Data
US 2015/0127235 A1    May 7, 2015

(30) Foreign Application Priority Data
Feb. 1, 2012  (DE) .................. 10 2012 201 436

(51) Int. Cl.
*G06F 19/00* (2011.01)
*G06G 7/00* (2006.01)
(Continued)

(52) U.S. Cl.
CPC .............. *B60T 13/72* (2013.01); *B60T 13/52* (2013.01); *B60T 17/22* (2013.01)

(58) Field of Classification Search
CPC .... B60T 13/686; B60T 8/3275; B60T 8/4836; B60T 13/662; B60T 13/72; B60T 8/4845;
(Continued)

(56) References Cited

U.S. PATENT DOCUMENTS 3,989,127 A * 11/1976 Staudenmaier ....... F16D 57/005
                                                      188/181 C
4,678,243 A *  7/1987 Leiber .................. B60T 8/3275
                                                      303/113.4
(Continued)

FOREIGN PATENT DOCUMENTS

CN         101001772 A       7/2007
DE         199 25 794        12/2000
(Continued)

OTHER PUBLICATIONS

International Search Report for PCT/EP2012/074885, dated Jun. 25, 2013.

*Primary Examiner* — Khoi Tran
*Assistant Examiner* — Jorge Peche
(74) *Attorney, Agent, or Firm* — Norton Rose Fulbright US LLP; Gerard Messina

(57) ABSTRACT

A brake actuation recognition device has an evaluation device by which at least one provided modification quantity relating to a temporal change in an actual quantity relating to a pressure in a pressure chamber of a brake booster of a brake system is compared with a specified comparison
(Continued)

quantity range such that, if the at least one provided modification quantity is within the comparison value range, it is determined that a brake actuating element situated on the brake system is in an actuation state below a specified minimum actuation state, and a corresponding information is outputted.

8 Claims, 5 Drawing Sheets

(51) Int. Cl.
  *B60T 13/72* (2006.01)
  *B60T 17/22* (2006.01)
  *B60T 13/52* (2006.01)

(58) Field of Classification Search
  CPC ........ B60T 13/52; B60T 2201/03; B60T 8/44; B60T 8/441; B60W 10/188; B60W 2510/18; B60W 2510/182; B60W 2710/18; B60W 2710/182
  USPC .......................................... 701/70, 76, 78, 83
  See application file for complete search history.

(56) References Cited

U.S. PATENT DOCUMENTS

| | | | | |
|---|---|---|---|---|
| 6,018,692 | A * | 1/2000 | Shimizu | B62D 15/0285 180/204 |
| 6,129,423 | A * | 10/2000 | Hashimoto | B60T 7/042 188/356 |
| 6,189,987 | B1 * | 2/2001 | Shimizu | B60T 7/042 303/113.4 |
| 6,227,629 | B1 * | 5/2001 | Yoshida | B60T 7/042 303/113.4 |
| 6,280,008 | B1 * | 8/2001 | Yoshida | B60R 16/0238 303/113.2 |
| 6,322,168 | B1 * | 11/2001 | Ohnuma | B60T 7/12 303/155 |
| 6,393,345 | B1 * | 5/2002 | Kerns | B60T 17/02 123/295 |
| 6,415,215 | B1 * | 7/2002 | Nishizaki | B60T 8/1755 180/167 |
| 6,520,601 | B1 * | 2/2003 | Kahl | B60T 8/48 303/113.2 |
| 7,434,894 | B2 * | 10/2008 | Toelge | B60T 7/12 303/15 |
| 7,699,411 | B2 * | 4/2010 | Nakaura | B60T 8/4275 303/119.1 |
| 8,315,754 | B2 * | 11/2012 | Ajiro | B60T 1/10 701/22 |
| 8,700,241 | B2 * | 4/2014 | Yoshimura | B60K 6/445 303/152 |
| 2001/0003402 | A1 * | 6/2001 | Isono | B60T 8/3275 303/155 |
| 2002/0053828 | A1 * | 5/2002 | Shimizu | B60T 7/042 303/113.4 |
| 2004/0016417 | A1 * | 1/2004 | Kerns | B60T 17/02 123/435 |
| 2008/0040012 | A1 * | 2/2008 | Kuzel | B60T 8/4872 701/70 |
| 2009/0044614 | A1 * | 2/2009 | Kaestner | B60T 13/52 73/121 |
| 2010/0270854 | A1 * | 10/2010 | Okano | B60T 1/10 303/3 |
| 2013/0197770 | A1 * | 8/2013 | Osaki | B60T 8/34 701/70 |
| 2013/0270895 | A1 * | 10/2013 | Nishioka | B60T 7/042 303/14 |
| 2014/0008965 | A1 * | 1/2014 | Ito | B60T 8/4081 303/3 |
| 2015/0158471 | A1 * | 6/2015 | Ezoe | B60T 7/22 701/70 |

FOREIGN PATENT DOCUMENTS

| | | |
|---|---|---|
| DE | 10 2006 0537 | 6/2007 |
| FR | 2 873 967 | 2/2006 |
| FR | 2 873 967 A1 | 2/2006 |
| JP | 2010-047145 A | 3/2010 |

* cited by examiner

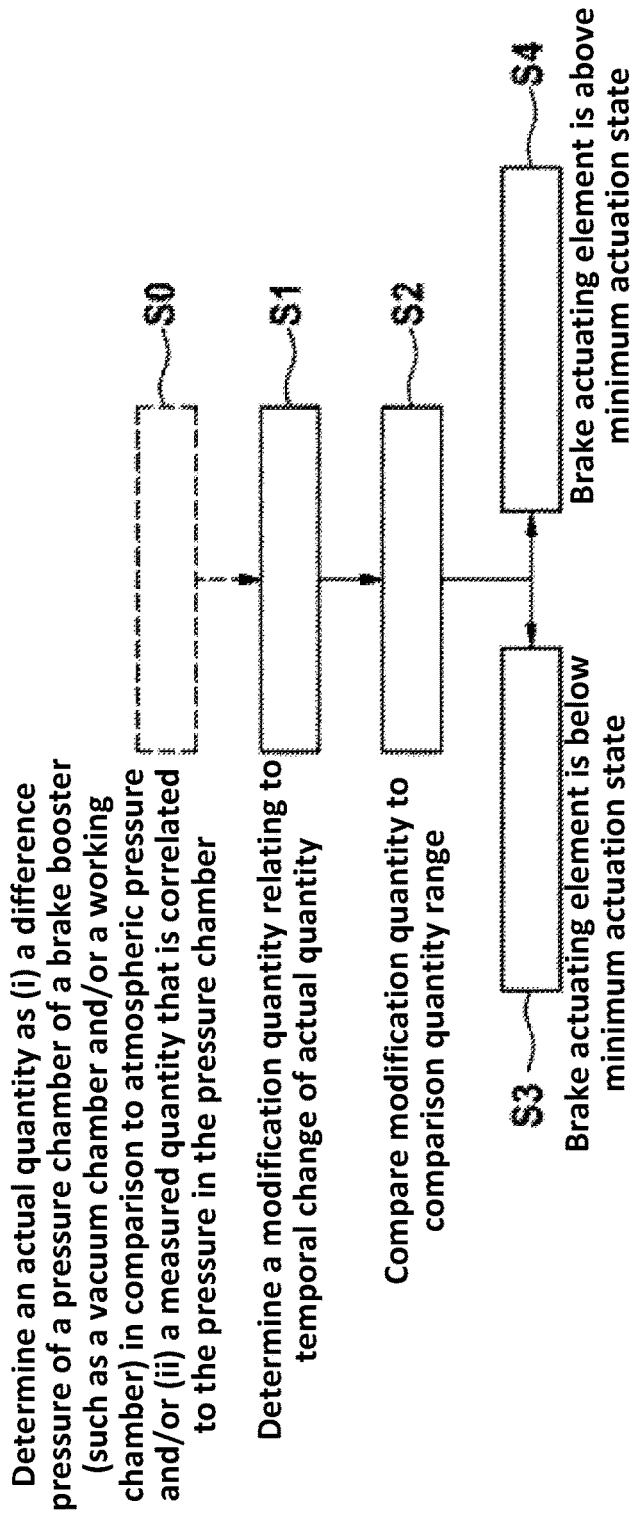

BRAKE ACTUATION RECOGNITION DEVICE AND METHOD FOR DETECTING AN ACTUATION OF A BRAKE ACTUATING ELEMENT OF A BRAKE SYSTEM

BACKGROUND OF THE INVENTION

1. Field of the Invention

The present invention relates to a brake actuation recognition device and to a monitoring device for a brake booster having a pressure chamber. The present invention also relates to a control device and to a brake system. In addition, the present invention relates to a method for determining an actuation of a brake actuating element of a brake system and to a method for monitoring the pressure in a pressure chamber of a brake booster.

2. Description of the Related Art

Published German patent application document DE 199 25 794 A1 describes a method for monitoring a difference pressure in a vacuum chamber of a brake booster relative to an atmospheric pressure. The difference pressure is monitored only when the brake pedal is not actuated. Non-actuation of the brake pedal is to be recognized using a sensor of the brake light switch.

BRIEF SUMMARY OF THE INVENTION

The present invention enables a reliable recognition of a specified minimum actuation of a brake actuating element such as a brake pedal. Here, a distinction can reliably be made between the brake actuating element being in an actuation state below the minimum actuation state and the brake actuating element being in an actuation state above the minimum actuation state. Taking into account the information obtained in this way regarding the actuation state of the brake actuating element, functions, equipment, and/or devices of a vehicle can be controlled so as to be in a mode that is advantageous with regard to the actuation state of the brake actuating element. Thus, the present invention can be used to optimize the functioning of a large number of functions, equipment, and/or devices of a vehicle with regard to a possible actuation of the brake actuating element.

It is to be noted that the present invention enables a recognition of the minimum actuation state of the brake actuating element without using a brake light switch. Thus, in a particularly advantageous specific embodiment the present invention can be used to save the sensor of the brake light switch required by the existing art. Moreover, an embodiment of the present invention does not require any information relating to a pre-pressure in a master brake cylinder.

Preferably, the brake actuation recognition device includes a differentiation device by which a time derivative of the provided actual quantity relating to the pressure in the pressure chamber of the brake booster can be determined as a modification quantity and provided to the evaluation device. The provided actual quantity can for example be a measured difference pressure of a pressure chamber, fashioned as a vacuum chamber or as a working chamber, of the brake booster, relative to an atmospheric pressure. Thus, in order to realize the present invention a quantity can be used that is used for a large number of further functions, such as a pressure monitoring in the respective pressure chamber and/or a calculation of a control point (e.g. of a hydraulic aggregate) of a brake system in order to support the pneumatic brake booster.

The advantages named above can be used in a monitoring device for a brake booster having a pressure chamber. During operation of the monitoring device, in this way it can be ensured that the monitoring device does not incorrectly interpret an actual quantity deviating from a target quantity range, relating to the pressure in the pressure chamber of the brake booster, resulting from an actuation of the brake actuating element as an error that triggers the pressure deviation. Thus, even in situations where there is frequent and/or dynamic brake actuation, the monitoring device can be reliably prevented from incorrectly interpreting the associated strong drop in the difference pressure in the pressure chamber as an error. In this way, functions such as the controlling of an electric vacuum pump can be prevented from being deactivated as a result of an incorrectly determined impairment of the pressure setting in the pressure chamber, and thus no longer supporting, in terms of force, the driver in his braking of the vehicle for a longer period of time. Moreover, the driver is not induced by a false error warning signal to make an unnecessary visit to a repair shop.

For example, the control device is designed to control, upon reception of the information signal indicating actuation above the minimum actuation as information signal, the pressure monitoring device from the first operating mode into the second operating mode, at least for a specified minimum operating time. Alternatively, the control device can also be designed to determine a number of the information signals indicating actuation above the minimum actuation received as information signals within a specified time interval, and, if the determined number corresponds at least to a maximum number, to control the pressure monitoring device from the first operating mode into the second operating mode. The operating mode of the pressure monitoring device is therefore capable of being optimized easily and reliably with regard to a possible actuation of the brake actuating element.

The advantages enumerated above can also be realized by a control device having such a monitoring device. Preferably, the control device is fashioned as an internal combustion engine control device, an electric motor control device, and/or an ESP control device. In this way, the advantages named above can be ensured by a compact unit that takes up comparatively little constructive space and is easy to install.

Moreover, the advantages can also be realized by a brake system having a corresponding brake actuation recognition device, a corresponding monitoring device, and/or such a control device.

In addition, the advantages can also be ensured by executing a corresponding method for determining an actuation of a brake actuating element of a brake system.

Finally, the advantages can also be realized by executing the corresponding method for pressure monitoring in a pressure chamber of a brake booster.

BRIEF DESCRIPTION OF THE DRAWINGS

FIG. 3 shows a flow diagram representing a specific embodiment of the method for determining an actuation of a brake actuating element of a brake system.

DETAILED DESCRIPTION OF THE INVENTION

Figure 1:
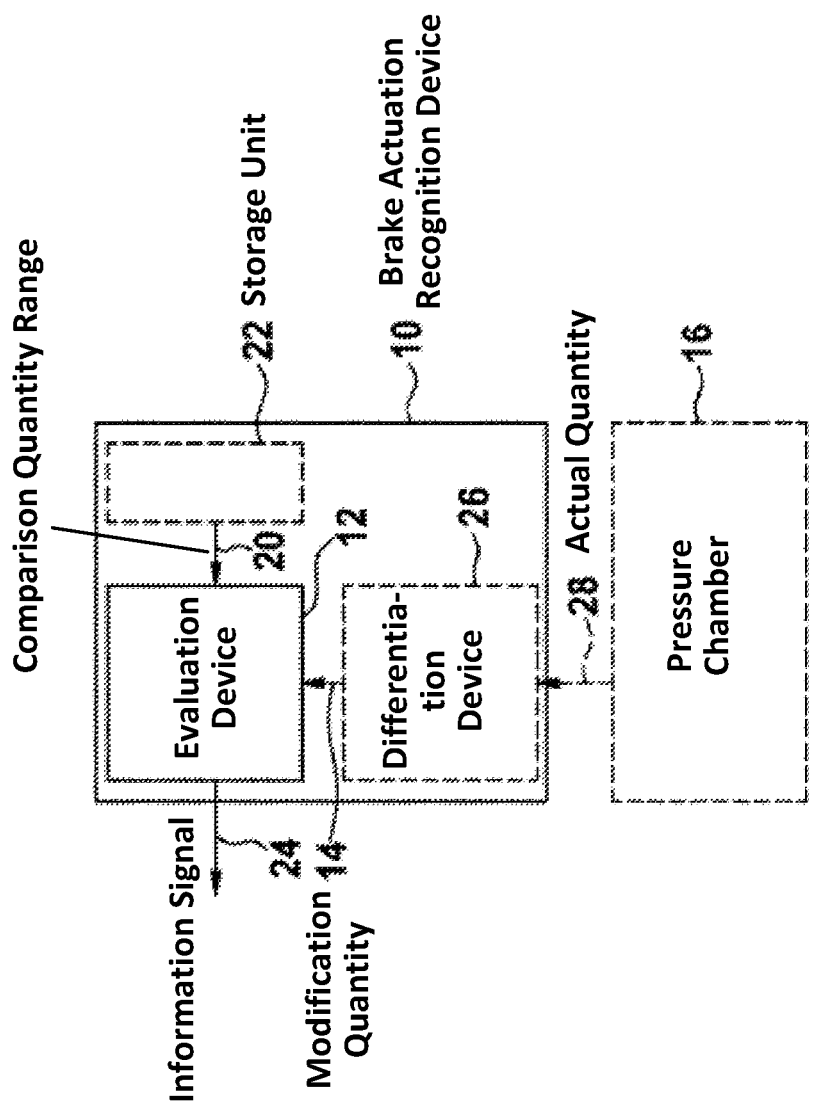
FIG. 1 shows a schematic representation of a specific embodiment of the brake actuation recognition device.

FIG. 1 shows a schematic representation of a specific embodiment of the brake actuation recognition device.

Brake actuation recognition device 10 shown schematically in FIG. 1 has an evaluation device 12 that can receive at least one (internally or externally) provided modification quantity 14 relating to a temporal change in an actual quantity (described in more detail below) relating to a pressure in a pressure chamber 16 of a brake booster (not shown in more detail). The at least one provided modification quantity 14 can be compared with a specified comparison quantity range 20 by evaluation device 12. (Comparison quantity range 20 can for example be outputted to evaluation device 12 by a storage unit 22.) Examples of the at least one modification quantity 14 and the comparison quantity range 20 are indicated in more detail below.

If the at least one provided modification quantity 14 is within comparison quantity range 20, evaluation device 12 is designed to determine that a brake actuating element (not shown) such as a brake pedal situated on the brake system is in an actuation state below a specified minimum actuation state. In particular, through a suitable definition of comparison quantity range 20 evaluation device 12 can in this situation determine that the brake actuating element is in its non-actuated state. A corresponding information signal indicating that the actuation state is below the minimum actuation state can be outputted as information signal 24 by evaluation device 12.

Likewise, if the at least one provided modification quantity 14 differs from comparison quantity range 20, evaluation device 12 can determine that the brake actuating element is in an actuation state that is above the specified minimum actuation state. In this situation as well, a corresponding information signal indicating a state above the minimum actuation can be outputted as information signal 24. For example, information signal 24, as an information signal indicating a state exceeding the minimum actuation, can state that the brake actuating element is in a state of active actuation.

In an advantageous development, brake actuation recognition device 10 also has a differentiation device 26 by which a time derivative of a provided actual quantity 28 relating to the pressure in pressure chamber 16 of the brake booster can be determined as modification quantity 14, and can be provided to evaluation device 12. Exemplary embodiments of actual quantity 28 are also indicated below.

Figure 2:
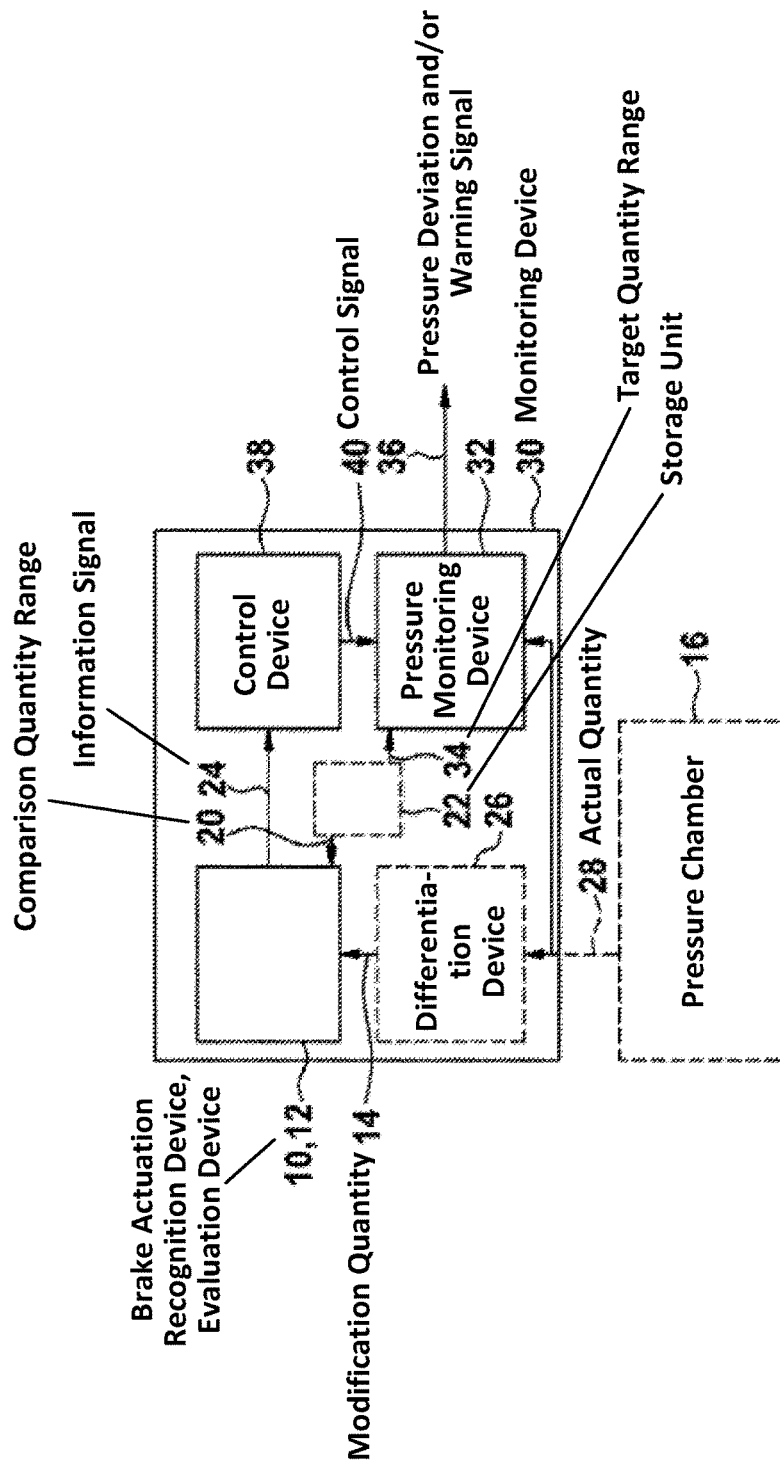
FIG. 2 shows a schematic representation of a specific embodiment of the monitoring device for a brake booster having a pressure chamber.

FIG. 2 shows a schematic representation of a specific embodiment of the monitoring device for a brake booster having a pressure chamber.

Monitoring device 30 described below is designed to work together with a brake booster that supports the driver when braking the vehicle. Preferably, the brake booster, represented only by its pressure chamber 16, is designed in such a way that it draws its energy to be applied in order to build up an additional brake pressure from a partial vacuum in pressure chamber 16. This can also be described by saying that the (maximum) brake boosting that can be applied using the brake booster is a direct function of a pressure level/partial vacuum level in pressure chamber 16, for example in a pressure chamber 16 fashioned as a vacuum chamber of the brake booster. However, it is to be noted that the applicability of monitoring device 30 (described in more detail below) is not fashioned to a particular design of the brake booster. Therefore, the design and the functioning of the brake booster equipped with pressure chamber 16 are not described in more detail below.

Monitoring device 30 includes brake actuation recognition device 10, described above, and preferably a differentiation device 26 situated externally or internally to brake actuation recognition device 10. Monitoring device 30 additionally has a pressure monitoring device 32 that, in a first operating mode, is designed to compare the provided actual quantity 28, relating to the pressure in pressure chamber 16 of the brake booster, to a specified target quantity range 34. (Target quantity range 34 can for example be provided by storage unit 22, situated externally or internally to brake actuation recognition device 10.)

If pressure monitoring device 32 is in the first operating mode and provided actual quantity 28 differs from specified target quantity range 34, then a corresponding pressure deviation and/or warning information signal 36 can be outputted by pressure monitoring device 32. At least one vehicle component can be informed of the pressure deviation in pressure chamber 16 from (preferred) target quantity range 34 by pressure deviation and/or warning information signal 36. Because, given presence of the pressure deviation for a particular period of time, for example in the case of a pressure in pressure chamber 16 that is below an error threshold, it is highly probable that an error is present in the brake booster, the at least one vehicle component can be controlled using pressure deviation and/or warning information signal 36 in such a way that its functioning is adapted to the impaired usability of the brake booster. Likewise, pressure deviation and/or warning information signal 36 can be used to deactivate at least one function of a control electronics unit of an electrical vacuum pump by which the pressure can be built up in pressure chamber 16. In addition, an outputting of pressure deviation and/or warning information signal 36 to a warning device inside the vehicle can be used to warn/inform the driver of the functional impairment/failure of the brake booster. In this way, the driver can adapt his driving behavior to the functional impairment/failure of the brake booster, and can timely look for a workshop in order to repair the recognized error.

In addition, pressure monitoring device 32 can be controlled to a second operating mode in which, despite at least one actual quantity 28 differing from specified target quantity range 34, an outputting of pressure deviation and/or warning information signal 36 is prevented. For the advantageous controlling of pressure monitoring device 32, monitoring device 30 is equipped with a control device 38 by which pressure monitoring device 32 can be controlled at least into the first operating mode or into the second operating mode through the outputting of a control signal 40, taking into account information signal 24 outputted by brake actuation recognition device 10.

Through the advantageous controlling of pressure monitoring device 32 by control device 38, the pressure monitoring/brake booster monitoring executed by pressure monitoring device 32 can be suppressed in situations in which it can be assumed that a pressure deviation from target pressure range 34 is present in pressure chamber 16 as a result of an actuation of the brake actuating element. In this way, it can reliably be prevented that a pressure deviation due to the actuation of the brake actuating element is incorrectly interpreted as an error recognition/sign of an error/effect of an error. In this way, it can be ensured that an error recognition is carried out only when an error is in fact present at the brake booster.

The situation in which there is a pressure deviation not caused by an error is present for example when there is a permanent actuation and release of the brake actuating element. Through this modulation, the pressure in pressure chamber 16 can deviate (significantly) from the specified target quantity range 34 even though the brake booster is in a properly functioning state. For example, when there is permanent actuation and release of the brake actuating element a desired vacuum in pressure chamber 16 can be diminished so strongly that an error threshold of target quantity range 34 is reached/exceeded.

By using brake actuation recognition device 10 and control device 38, the permanent actuation and release of the brake actuating element can however be reliably recognized, and pressure monitoring device 32 can be correspondingly deactivated. In this way, it can for example be prevented that the electrical vacuum pump is deactivated even though no error is present at the brake booster. This avoids a situation in which, due to the deactivation of the electrical vacuum pump caused by the incorrect error recognition, the driver can brake the vehicle only by applying greater force, and/or in which due to a deactivation of a start-stop functionality greater pollutant emissions and/or a greater vehicle energy consumption have to be accepted.

Control device 38 can for example be designed so that upon reception of the information signal indicating actuation above the minimum actuation as information signal 25 (for a particular minimum time interval) pressure monitoring device 32 is controlled from the first operating mode into the second operating mode, at least for a specified minimum operating time. Thus, already given a single recognition of a modification quantity 14 outside comparison quantity range 20, the pressure monitoring carried out in pressure chamber 16 by pressure monitoring device 32 can be deactivated.

As an alternative to the specific embodiment described in the preceding paragraph, control device 38 can also be designed to determine the number of information signals indicating an actuation above the minimum actuation received as information signals 24 within a specified time interval, and to compare this number with a specified maximum number. If the determined number corresponds at least to the maximum number, control device 38 can be designed to control pressure monitoring device 32 from the first operating mode into the second operating mode. In this case, the brake booster monitoring/pressure monitoring carried out by pressure monitoring device 32 is stopped/deactivated not when modification quantity 14 exceeds a boundary value of comparison quantity range 20 for the first time, but rather only when there is a repeated alternation of extremely high and low values of modification quantity 14. Thus, monitoring device 30 can also work together with a brake booster whose pressure chamber 16 and/or pressure build-up system is designed such that a one-time actuation of the brake actuating element does not cause, or hardly causes, a significant change in the pressure in pressure chamber 16. (Repeated actuation/frequent actuation of the brake actuating element within the specified time interval can however significantly change the pressure in pressure chamber 16.) Thus, monitoring device 30 shown here can work together with a large number of differently designed brake boosters.

The advantages described above are also ensured in the case of a control device equipped with monitoring device 30. The control device can in particular be fashioned as an internal combustion engine control device, an electric motor control device, and/or as an ESP control device. Moreover, the control device can also be fashioned as a power management unit for an electric vehicle. Monitoring device 30 is therefore capable of being integrated into a large number of control devices in a manner that saves constructive space.

The named advantages are also realized by a brake system equipped with brake actuation recognition device 10, monitoring device 30, or a corresponding control device. Here, the advantageous brake system is not limited to a particular design. Therefore, the design and the components of the advantageous brake system are not described in more detail here.

FIG. 3 shows a flow diagram representing a specific embodiment of the method for determining an actuation of a brake actuating element of a brake system.

The method described in the following can for example be realized using the brake actuation recognition device explained above, or using the corresponding monitoring device. However, it is to be noted that the practicability of the method is not limited to a use of the specific embodiments described above.

In a method step S1, at least one modification quantity is determined relating to a temporal change of an actual quantity relating to a pressure in a pressure chamber of a brake booster of a brake system. For example, in method step S1 a time derivative/gradient of the actual quantity relating to the pressure in the pressure chamber of the brake booster is determined as modification quantity. However, as modification quantity it is also possible to determine a difference between two successively determined actual quantities, and to evaluate this difference using the method steps described below.

Optionally, before method step S1 a method step S0 can be executed. In method step S0, for example a difference pressure is determined of a pressure chamber, fashioned as a vacuum chamber, of the brake booster in comparison with an atmospheric pressure, as actual quantity relating to the pressure in the pressure chamber of the brake booster. As an alternative, or in addition, as actual quantity relating to the pressure in the pressure chamber of the brake booster it is also possible to determine a difference pressure of a pressure chamber, fashioned as working chamber, of the brake booster in comparison with atmospheric pressure. In addition, a (measured) quantity that is reliably correlated to the pressure in the pressure chamber can be determined as actual quantity and evaluated.

After method step S1 described above, a method step S2 is carried out. In method step S2, the at least one determined modification quantity is compared to a specified comparison quantity range. The specified comparison quantity range is preferably defined in such a way that a deviation of the modification quantity from the specified comparison quantity range is taken to be present only if there takes place an actuation of the brake actuating element with at least a particular minimum actuation strength. The specified comparison quantity range, or its boundary values, can in particular correspond to a minimum actuation strength/minimum actuation state in the actuation of the brake actuating element in such a way that the determined modification quantity is (with a high probability) outside the comparison quantity range only when there is an exceeding of the minimum actuation strength/beginning from an actuation of the brake actuating element above the minimum actuation state.

If in method step S2 it is determined that the at least one determined modification quantity is in the comparison range, then a method step S3 is carried out. In method step S3 it is determined that a brake actuating element situated on the brake system is in an actuation state below a specified minimum actuation state. This can also be described by saying that in method step S3 a determination of a currently executed brake actuation strength at the brake actuating element is greater than a minimum actuation strength that is correlated with the comparison quantity range.

If, in the comparison of the at least one determined modification quantity with the specified comparison quantity range in method step S2, it is determined that the at least one provided modification quantity differs from the comparison quantity range, a method step S4 is carried out. Method step S4 contains a determination that the brake actuating element is in an actuation state above the specified minimum actuation state. This can also be described by saying that a currently executed brake actuation strength is determined that is greater than the minimum actuation strength correlated with the comparison quantity range.

The method described in the above paragraphs can also be described as a logic system that estimates, on the basis of a measured difference pressure curve, whether the brake actuating element situated on the brake system is at least in the specified minimum actuation state, or is actuated with a specified minimum actuation strength. The method for determining an actuation of a brake actuating element of a brake system thus realizes the advantages described above. A repeated description of these advantages is not provided here.

Figure 4A:
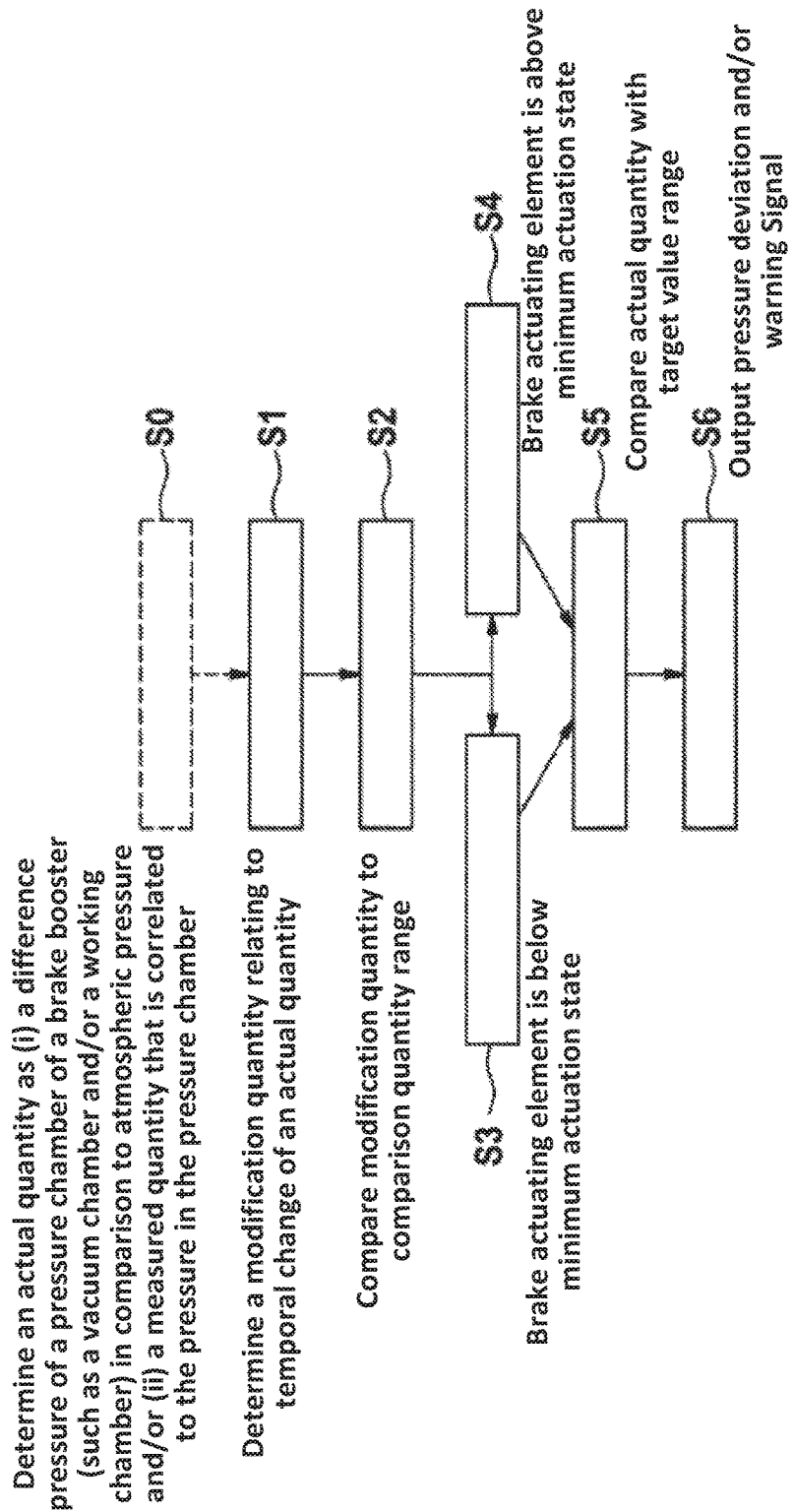
FIGS. 4a through 4c show a flow diagram and two coordinate systems representing a first specific embodiment of the method for pressure monitoring in a pressure chamber of a brake booster.
Figure 4B:
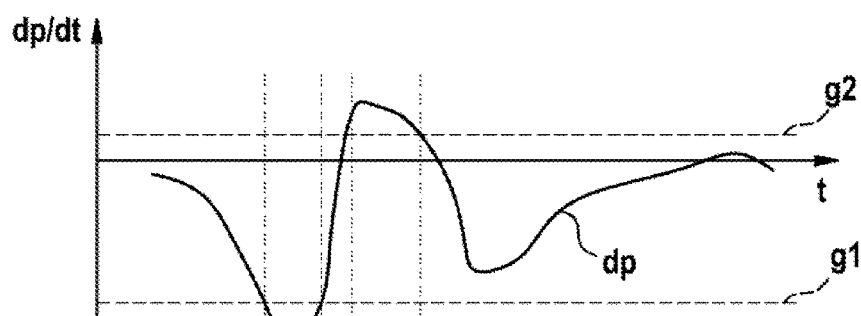
Figure 4C:
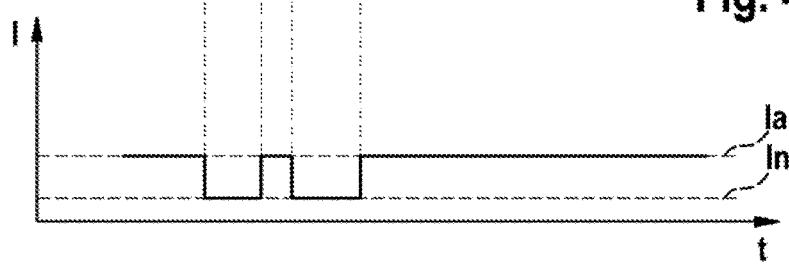

FIGS. 4a through 4c show a flow diagram and two coordinate systems representing a first specific embodiment of the method for pressure monitoring in a pressure chamber of a brake booster.

The method shown in FIG. 4a as a flow diagram includes method steps S1 through S4 described above. Optionally, the method can also include method step S0 described above.

FIG. 4b shows a temporal curve of the modification quantity determined in method step S1 as graph dp (pressure gradient), where the abscissa is time axis t and the ordinate is a pressure increase dp/dt. FIG. 4b also shows the comparison quantity range used in method step S2 for the comparison, using the two boundary values g1 and g2. Lower first boundary value g1 (first gradient threshold value) can for example be at −250 mbar/sec (millibars per second). A value of for example 10 mbar/sec can for example be used for upper second boundary value g2 (second gradient threshold value). The numerical values named here are however to be interpreted only as examples. (Boundary values g1 and g2 can in particular be adapted to the specific project.)

When the modification quantity falls below lower first boundary value g1, this is an indication that a significant change in the pressure in the pressure chamber of the brake booster has occurred as a result of a (significant) actuation of the brake actuating element. Thus, it is advantageous in this case to detect/determine a deviation of the modification quantity from the comparison quantity range (method step S4).

It is to be noted that the comparison quantity range can also have an upper second boundary value g2. If the modification quantity exceeds upper second boundary value g2, this can also be interpreted as a previous actuation of the brake actuating element that has triggered an activation of a pressure-setting device, such as a pump, causing the difference pressure in the pressure chamber of the brake booster to (strongly) increase. (Moreover, when the modification quantity exceeds upper second boundary value g2, this indicates with high probability that a pressure-setting device of the brake booster is working reliably. It therefore makes sense in such a situation to (temporarily) go without particular monitoring functions, such as monitoring of a pressure/pressure setting in the pressure chamber of the brake booster. However, if it is not desired to take into account upper second boundary value g2, the comparison quantity range can have only lower, first boundary value g1.

The method for pressure monitoring also has a method step S5 that is executed after method steps S3 or S4 if the brake actuating element is in an actuation state below the specified minimum actuation state, or if within a specified time interval it is in the actuation state above the specified minimum actuation state fewer times than a specified highest number. In this way, during execution of the method presented here there is the possibility of selecting whether a single determination that the brake actuating element is in an actuation state above the specified minimum actuation state will already result in omission of method step S5, or whether, with the interruption of method step S5, waiting will take place until, within the specified time interval, the brake actuating element is in an actuation state above the specified minimum actuation state at least the specified maximum number of times. If method step S5 is omitted/interrupted, the method can be terminated immediately. Moreover, in this case the method can be restarted after a specified waiting time interval has elapsed.

In method step S5, the actual quantity relating to the pressure in the pressure chamber of the brake booster is compared with a specified target value range. Due to the functional dependence of an execution of method step S5 on the operating state of the brake actuating element determined in method steps S3 or S4, in this way a single determination that the brake actuating element is in an actuation state above the specified minimum actuation state can already result in a termination of a pressure monitoring in the pressure chamber of the brake booster. As an alternative, pressure monitoring in the pressure chamber of the brake booster can also be interrupted only in those situations in which, within the specified time interval, the brake actuating element is in an actuation state above the specified minimum actuation state at least the specified maximum number of times. In this way, the pressure monitoring can be interrupted in a situation in which an incorrect error recognition resulting from a (single or frequent) actuation of the brake actuating element can be taken to have occurred. The method described here can also thus be optimized for a large number of different brake booster designs.

If in method step S5 it is determined that the provided actual quantity deviates from the specified target quantity range with at least a specified maximum frequency of deviation, a method step S6 is carried out. Otherwise, the method (without method step S6) can be terminated. Preferably, in this case there also takes place a repetition of the method, after the specified waiting time interval has elapsed.

In method step S6, a pressure deviation and/or warning information signal is outputted. In this way, the advantageous pressure deviation and/or warning information signal can be provided by executing the method.

Method steps S5 and S6 can for example be carried out by the pressure monitoring device already described above. For this purpose, the pressure monitoring device can be controlled by a signal I that is the ordinate of the coordinate system of FIG. 4c. The abscissa of the coordinate system of FIG. 4c is time axis t.

If modification quantity dp shown in FIG. 4b is within a band defined by boundary values d1 and d2, then (in method step S3) a sufficiently high signal Ia is provided and at least method step S5/the monitoring of the actual quantity is carried out. In the case of a modification quantity dp outside the band, a (rapid) brake actuation or a (rapid) release of the brake actuating element can be assumed. Correspondingly, in method step S4 a non-sufficient signal In is provided. This brings about omission/interruption of method step S5/the monitoring of the actual quantity.

As can be seen on the basis of FIG. 4b, when there is constant actuation and release of the brake, modification quantity dp changes with a medium frequency between large and small values. For a reliable error recognition, an error counter can be restarted when there is an occurrence of modification quantity dp outside boundary values g1 and g2. (If significantly high values occur for the at least one modification quantity dp, this is a sign that an evacuation/pressure buildup is possible, and therefore no error can be present at the pressure-setting device of the brake booster or at the pressure chamber.)

Given a high actuation frequency of the brake actuating element, it can be that there are no significant phases of pressure recovery/vacuum recovery. However, the low determined values of modification quantity dp are so close to one another that the monitoring is repeatedly deactivated/stopped, and, on the basis of an associated repeated starting of the error counter, a reliable error recognition can be taken to be present.

Figure 5A:
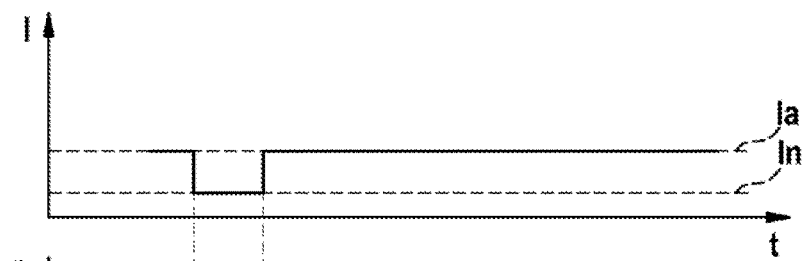
FIGS. 5a and 5b show two coordinate systems representing a second specific embodiment of the method for pressure monitoring in a pressure chamber of a brake booster.
Figure 5B:
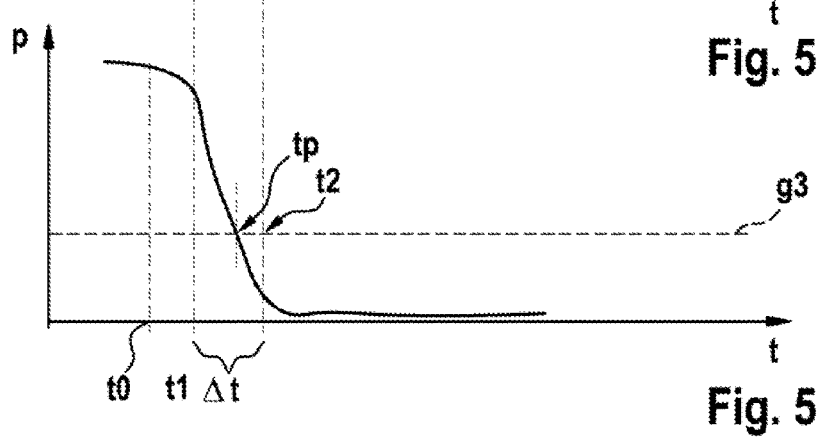

FIGS. 5a and 5b show two coordinate systems representing a second specific embodiment of the method for pressure monitoring in a pressure chamber of a brake booster.

As abscissas, the two coordinate systems of FIGS. 5a and 5b have time axis t. The ordinate of the coordinate system of FIG. 5a is signal I described above. In the coordinate system of FIG. 5b, the ordinate illustrates a difference pressure p between an atmospheric pressure and a partial vacuum/vacuum in the pressure chamber of the brake booster. (A high value of difference pressure p therefore indicates a vacuum in the pressure chamber.) (Lower) boundary value g3 entered in FIG. 5b corresponds to the target quantity range used for the comparison of difference pressure p. Starting from a difference pressure p that is below boundary value g3, it can be assumed that there is a high probability of a significant vacuum loss in the pressure chamber.

If a rapid vacuum loss occurs from a time t0, then beginning from a time t1 extremely low values (below zero, with high magnitude) will occur for the modification quantity. Beginning from a time t2, the vacuum loss has already proceeded so far that the pressure in the pressure chamber is almost equal to atmospheric pressure. Thus, from time t2 there occur only modification quantities having a low magnitude. This can also be described by saying that in the case of a rapid vacuum loss, as a rule the modification quantity goes to zero when a partial vacuum is no longer present.

In an interruption time interval Δt between times t1 and t2, the (significantly small) modification quantity is outside the comparison quantity range. Therefore, in interruption time interval Δt no comparison of difference pressure p to boundary value g3 is carried out. Therefore, at time tp in interruption time interval Δt it is also not recognized that difference pressure p falls below third boundary value g3. However, between times tp and t2 there is only a small time difference, for example 1.5 seconds. Therefore, despite the delay in the difference pressure monitoring during interruption time interval Δt the error occurring at the brake booster, the pressure-setting device, and/or the pressure chamber can be recognized relatively quickly. In this way, it is timely possible, using the pressure deviation and/or warning information signal, to counteract the error, to at least partly compensate the effects of the error, or to inform the driver about the error.

In the case of a slow vacuum loss, the modification quantity is within the specified comparison value range. Therefore, in this case there is no delay in the error recognition.

As can be seen on the basis of the coordinate systems of FIGS. 5a and 5b, the method depicted here can (reliably) recognize not only an error that causes a slow vacuum loss but also an error that causes a fast vacuum loss.

What is claimed is:

1. A monitoring device for a brake booster having a pressure chamber, comprising:
 a brake actuation recognition device including a processor configured to:
 compare at least one provided modification quantity relating to a temporal change of an actual quantity relating to a pressure in a pressure chamber of a brake booster of a brake system to a specified comparison value range, wherein the actual quantity is a measured quantity; and
 (i) if the at least one provided modification quantity is within the comparison value range, determining that a brake actuating element situated on the brake system is in an actuation state below a specified minimum actuation state, and outputting a corresponding first information signal indicating an actuation below the minimum actuation, and (ii) if the at least one provided modification quantity differs from the comparison quantity range, determining that the brake actuating element is in an actuation state above the specified minimum actuation state, and outputting a corresponding second information signal indicating actuation above the minimum actuation;
 a pressure monitoring device including a processor configured to compare the actual quantity relating to the pressure in the pressure chamber of the brake booster with a specified target quantity range and, if the provided actual quantity differs from the specified target quantity range, output at least one of a corresponding pressure deviation and a warning information in a first operating mode, and not output at least one of a corresponding pressure deviation and a warning information in second operating mode; and
 a control device including a processor selectively controlling the pressure monitoring device into at least one of the first operating mode and the second operating mode, taking into account the information signal outputted by the brake actuation recognition device, wherein in the first operational, the control device controls a physical operation of a vehicle component.

2. The monitoring device as recited in claim 1, wherein the control device controls, upon reception of the second information signal indicating an actuation above the minimum actuation, the pressure monitoring device from the first operating mode into the second operating mode at least for a specified minimum operating time.

3. The monitoring device as recited in claim 1, wherein the control device (i) determines a number of the second information signals received within a specified time interval, and (ii) if the determined number of the second information signals corresponds to a specified maximum number, controls the pressure monitoring device to switch from the first operating mode into the second operating mode.

4. A method for determining an actuation of a brake actuating element of a brake system, comprising performing the following at a processor:
   determining at least one modification quantity relating to a temporal change of an actual quantity relating to a pressure in a pressure chamber of a brake booster of a brake system, wherein the actual quantity is a measured quantity;
   comparing the at least one determined modification quantity with a specified comparison quantity range;
   (i) if the at least one determined modification quantity is in the comparison quantity range, determining that a brake actuating element situated on the brake system is in an actuation state below a specified minimum actuation state, and (ii) if the at least one determined modification quantity differs from the comparison quantity range, determining that the brake actuating element is in an actuation state above the specified minimum actuation state,
   comparing the actual quantity relating to the pressure in the pressure chamber of the brake booster with a specified target quantity range and, if the provided actual quantity differs from the specified target quantity range, output at least one of a corresponding pressure deviation and a warning information in a first operating mode, and not output at least one of a corresponding pressure deviation and a warning information in second operating mode; and
   selectively controlling a pressure monitoring device into at least one of the first operating mode and the second operating mode, taking into account an information signal outputted by a brake actuation recognition device, wherein in the first operational mode, a physical operation of a vehicle component is controlled.

5. The method as recited in claim 4, wherein a time derivative of the actual quantity relating to the pressure in the pressure chamber of the brake booster is determined as the modification quantity.

6. The method as recited in claim 5, wherein a difference pressure of a vacuum chamber of the brake booster in comparison with an atmospheric pressure is determined as the actual quantity relating to the pressure in the pressure chamber of the brake booster.

7. The method as recited in claim 5, wherein a difference pressure of a working chamber of the brake booster in comparison with an atmospheric pressure is determined as the actual quantity relating to the pressure in the pressure chamber of the brake booster.

8. The method as recited in claim 4, wherein:
   if one of (i) the brake actuating element is in an actuation state below the specified minimum actuation state, or (ii) within a specified time interval, the brake actuating element is in an actuation state above the specified minimum actuation state fewer times than a specified maximum number, then comparing the actual quantity relating to the pressure in the pressure chamber of the brake booster with a specified target quantity range; and
   if the actual quantity relating to the pressure in the pressure chamber differs from the specified target quantity range with at least a specified maximum frequency of deviation, outputting at least one of a pressure deviation information and warning information.

* * * * *